US008910166B2

(12) United States Patent
Rosenberg et al.

(10) Patent No.: US 8,910,166 B2
(45) Date of Patent: Dec. 9, 2014

(54) AUTOMATIC TRANSCODING AND SEMANTIC ADAPTATION BETWEEN SCRIPTING AND WORKFLOW SYSTEMS

(75) Inventors: Miriam Rosenberg, Kirkland, WA (US); Bruce G. Payette, Bellevue, WA (US); Jeffrey P. Snover, Woodinville, WA (US); Rahim Maknojia, Bellevue, WA (US); Christine Moeller, Redmond, WA (US); Narayanan Lakshmanan, Bothell, WA (US); Hemant Mahawar, Redmond, WA (US); Constantin Oprea, Seattle, WA (US); Lee Holmes, Renton, WA (US); Kenneth M. Hansen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 13/270,227

(22) Filed: Oct. 11, 2011

(65) Prior Publication Data

US 2013/0067476 A1 Mar. 14, 2013

Related U.S. Application Data

(60) Provisional application No. 61/533,129, filed on Sep. 9, 2011.

(51) Int. Cl.
*G06F 9/46* (2006.01)
*G06F 9/48* (2006.01)

(52) U.S. Cl.
CPC .................................... *G06F 9/4843* (2013.01)
USPC ......................................... 718/100; 705/7.27

(58) Field of Classification Search
None
See application file for complete search history.

(56) References Cited

U.S. PATENT DOCUMENTS

| | | | | |
|---|---|---|---|---|
| 6,934,932 B2* | 8/2005 | Dathathraya | ................. | 717/115 |
| 7,971,186 B1* | 6/2011 | Peyton | ........................ | 717/115 |
| 8,136,099 B2* | 3/2012 | Haller et al. | .................. | 717/136 |
| 2002/0111841 A1* | 8/2002 | Leymann et al. | ................. | 705/7 |
| 2004/0078373 A1* | 4/2004 | Ghoneimy et al. | ............. | 707/10 |
| 2005/0066304 A1* | 3/2005 | Tattrie et al. | .................. | 717/101 |

(Continued)

OTHER PUBLICATIONS

Pau, Ryan, "How to Build Mac OS X services with Automator and Shell Scripting", Retrieved at <<http://arstechnica.com/apple/guides/2011/03/howto-build-mac-os-x-services-with-automator-and-shell-scripting.ars/2>>, Retrieved Date: Aug. 23, 2011, pp. 4.

(Continued)

*Primary Examiner* — Emerson Puente
*Assistant Examiner* — Mehran Kamran
(74) *Attorney, Agent, or Firm* — Henry Gabryjelski; Kate Drakos; Micky Minhas (57) ABSTRACT

A workflow scripting system is described herein that combines the features of workflows and scripts by automatically translating between the two models. Using the system, a script author can create workflows on the fly using familiar scripting language, and a workflow author can use scripting steps to perform actions. Workflows run in this manner can be setup to execute in their own process to improve robustness or efficiency. Operations in an enterprise environment frequently take a long time and are subject to interruptions. By adding reliability concepts of workflows to a shell environment, users of the system can write scripts to address common needs of large-scale computing environments. Thus, the workflow scripting system blends the available resources provided by workflow and scripting environments to provide a host of powerful, advanced capabilities to IT personnel.

18 Claims, 6 Drawing Sheets

(56) References Cited

U.S. PATENT DOCUMENTS

| | | | |
|---|---|---|---|
| 2006/0074704 A1* | 4/2006 | Shukla et al. | 705/1 |
| 2006/0200749 A1* | 9/2006 | Shenfield | 715/501.1 |
| 2006/0248466 A1* | 11/2006 | Fedorenko et al. | 715/744 |
| 2008/0276229 A1* | 11/2008 | Hawkins et al. | 717/136 |
| 2009/0112873 A1* | 4/2009 | Nanjangud Bhaskar et al. | 707/10 |
| 2009/0187886 A1* | 7/2009 | Peck et al. | 717/117 |
| 2009/0328010 A1* | 12/2009 | Cao et al. | 717/139 |
| 2010/0106547 A1* | 4/2010 | Adi et al. | 705/8 |
| 2010/0153482 A1* | 6/2010 | Kim et al. | 709/201 |
| 2010/0211420 A1* | 8/2010 | Kodi et al. | 705/7 |
| 2011/0023013 A1* | 1/2011 | Shenfield et al. | 717/107 |
| 2011/0035742 A1* | 2/2011 | Shenfield | 717/171 |
| 2012/0179625 A1* | 7/2012 | Holmes | 705/338 |

OTHER PUBLICATIONS

"Transforming a Shell Script into an Automator Action", Retrieved at <<http://developer.apple.com/appleapplications/transformscriptintoaction.html>>, Jun. 5, 2007, pp. 6.

"Automating Development Tasks with Automator and Xcode", Retrieved at <<http://developer.apple.com/tools/xcode/automatorforxcode.html>>, Aug. 7, 2006, pp. 10.

Wang, et al., "Compiling the Uncompilable: A Case for Shell Script Compilation", Retrieved at <<http://dust.ess.uci.edu/ppr/ppr_WZJ083.pdf>>, Aug. 7, 2008, pp. 1-36.

"Pig New Parser", Retrieved at <<http://wiki.apache.org/pig/PigNewParser>>, Oct. 8, 2010. pp. 8.

* cited by examiner

AUTOMATIC TRANSCODING AND SEMANTIC ADAPTATION BETWEEN SCRIPTING AND WORKFLOW SYSTEMS

CROSS-REFERENCE TO RELATED APPLICATIONS

The present application claims priority to U.S. Provisional Patent Application No. 61/533,129 entitled "AUTOMATIC TRANSCODING AND SEMANTIC ADAPTATION BETWEEN SCRIPTING AND WORKFLOWS", and filed on Sep. 9, 2011, which is hereby incorporated by reference.

BACKGROUND

Users of computing environments often encounter a need to automate various tasks. End users may wish to automate frequently performed individual tasks, while information technology (IT) personnel may be tasked with automating large tasks that span many computer systems. Tasks may include actions such as application installation and maintenance, computer setup, security verification, updating an inventory of systems and applications, and so forth.

Workflows provide one method of automating tasks in computing environments. Software programming has evolved over time from writing applications in low-level languages, such as assembly, to high-level languages like C++, C#, and Visual Basic. Higher-level languages often remove low-level management of memory and other machine-based limitations in favor of allowing the programmer to think more in terms of objects that represent the problem to be solved. However, there is still much complexity in application logic, particularly when managing asynchronous processing. Workflows, such as those provided by MICROSOFT™ WINDOWS™ Workflow Foundation (WF), provide a declarative framework for formulating application and service logic in a high-level manner as one or more workflows. Workflows are made of activities that process a particular stage of the application's processing. A group of activities forms a workflow. Workflows can be paused and resumed as applications wait for responses from other components, and are particularly well suited to asynchronous programming to improve developer productivity. WF provides a set of tools for declaring workflows, activities to help define the logic and control flow, and a runtime for executing the resulting application definition.

Scripting provides another method of automating tasks in computing environments. Scripting generally includes a scripting language and host that reads a text file or console input that provides instructions in the scripting language to carry out a variety of actions. Unlike workflows, scripts are generally much less formal and do not demand the same programmatic knowledge common to traditional software programming. Scripts can be built and tested quickly with little more tools than a text editor and the scripting host.

Unfortunately, these existing methods lie at opposite extremes of the spectrum of automating tasks, and each includes limitations that make it difficult to use for particular tasks. For example, building workflows generally involves setting up a programming environment (such as MICROSOFT™ Visual Studio) and acquiring programming skills to develop and debug workflows. This limits their accessibility and increases the expense of automating tasks. Limited programmer resources can become a bottleneck for getting things done. Scripting, while great for small, single-machine tasks, is much more difficult to use for longer tasks with potentially many dependent steps that span potentially many computer systems. In particular, scripting lacks the kind of error detection and error handling available in higher level programming languages, and is not good at stopping, recovering, and restarting after errors or unexpected events. One example of a set of steps that is difficult to perform with scripting is any task that involves rebooting a computer system. Once the system is rebooted, the script is no longer running and cannot resume at some correct point when the computer system restarts.

SUMMARY

A workflow scripting system is described herein that combines the features of workflows and scripts by automatically translating between the two models. Using the system, a script author can create workflows on the fly using familiar scripting language, and a workflow author can use scripting steps to perform actions. The workflows created in this manner can be stopped and restarted like traditional workflows, but this power can be accessed through a scripting environment or command shell. In addition, workflows run in this manner can be setup to execute in their own process to improve robustness or efficiency. Operations in an enterprise environment frequently take a long time and are subject to interruptions. Traditional shell scripting languages are not designed to operate efficiently in these environments or to run operations at high scale. By adding reliability concepts of workflows to a shell environment, users of the system can write scripts to address common needs of large-scale computing environments. Thus, the workflow scripting system blends the available resources provided by workflow and scripting environments to provide a host of powerful, advanced capabilities to IT personnel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A workflow scripting system is described herein that combines features of workflows and scripts by automatically translating between the two models so that scripts can use workflows and workflows can use scripts. Using the system, a script author can create workflows on the fly using familiar scripting language, and a workflow author can use scripting steps to perform actions. The workflows created in this manner can be stopped and restarted like traditional workflows, but this power can be accessed through a scripting environment or command shell (as used herein a scripting environment may include a shell or other environment without a traditional scripting language, through which commands may be provided). In addition, workflows run in this manner can be setup to execute in their own process to improve robustness or efficiency (e.g., through parallelism). Operations in an enterprise environment frequently take a long time and are subject to interruptions. Traditional shell scripting languages are not designed to operate efficiently in these environments or to run operations at high scale. By adding reliability concepts of workflows to a shell environment, users of the system can write scripts to address common needs of large-scale computing environments.

In related work, the ability to use commands of a shell environment, such as MICROSOFT™ WINDOWS™ POWERSHELL™, as workflow activities has been described (see, e.g., U.S. patent application Ser. No. 12/372,746, entitled "CONVERTING COMMAND UNITS INTO WORKFLOW ACTIVITIES"). The workflow scripting system builds on this work by making the use of workflow concepts and objects native, first-class operations in a shell-scripting environment (e.g., they can be used directly and easily within any script). The system enhances the scripting environment and language to support scalable, highly reliable, multi-machine operations via the application of workflow concepts. The system is a composition and extension of existing components of shell scripting languages and workflow services, which helps enable highly reliable and scalable multi-machine management, improves the workflow authoring process and its functionality, and provides the ability to survive failures and interrupts in enterprise environments.

In some embodiments, the workflow scripting system adds workflow related operations to an existing scripting environment. For example, the system may add a "parallel" operation that provides a keyword for running other operations in parallel, a "persist" operation that can take a snapshot and store a workflow runtime state, a "resume" operation that can resume from a previous error or paused state, and any other operations suitable for providing workflow behavior in the scripting environment. Upon receiving a workflow related command in the scripting environment, the system maps the command to an appropriate workflow object (e.g., a compiled workflow or the workflow host itself), and invokes the workflow object to perform the command. Performing the command may include automatically generating extensible markup language (XML) or other intermediate data for building a workflow (e.g., an Extensible Application Markup Language (XAML) file), querying a workflow host for status information, invoking workflow host commands to start/pause/resume workflows, and so forth.

During or following the command, the system may receive robust error or status information. The modified scripting environment allows the script author to react to such errors and handle them in traditional workflow form directly from a script. For example, the author may choose to restart a failed sequence of commands, delay performing a command until another time, log information about failures, and so forth. Going in the opposite direction, the workflows thus created or separately authored may also invoke commands provided by the scripting environment. In some embodiments, the system also provides an automated ability to invoke manually created workflow elements, such as by automatically creating scripting commands and help information for viewing and selecting workflow action parameters. Thus, the workflow scripting system blends the available resources provided by workflow and scripting environments to provide a host of powerful, advanced capabilities to IT personnel.

The workflow scripting system provides several helpful abilities to IT personnel for leveraging workflows through scripts more effectively. First, the system provides an ability to transcode an existing scripting language to a workflow. For example, the system can map WINDOWS™ POWERSHELL™ semantics to workflow semantics. This includes an ability to map scripting syntax to workflow activities and flag errors, wrap activities in helper functions to provide consistent behavior (e.g., logging progress reporting, state checkpointing, remoting), and so forth. The system also provides an ability to add workflow parameters and semantics to existing command-line abstractions. These additional semantics include the ability to execute as a background job using the AsJob parameter or target multiple computers using the PSComputerName parameter. The system also provides an ability to analyze a workflow and partition multiple execution units into different environments (e.g., processes) to manage security, fault tolerance, performance and concurrency, among others (out of process workflow-activity execution). The system does this by mapping command-line syntax to workflow runtime capabilities. In addition, the system provides automatic wrapping of a workflow with helper functions to provide rich, consistent command-line semantics, e.g., debug, verbose, run as background job, and so forth. Conversely, the system extends the workflow runtime to support rich, consistent command-line semantics such as multiple output streams (output, error, debug, and so on), consistent command-line option processing, and so forth.

The workflow scripting system includes full integration of a workflow engine with a shell script language, which provides an ability to define workflow activities in the format of a shell script (e.g., WINDOWS™ POWERSHELL™ or others) and use these activities within a workflow environment, an ability to define the workflow itself in the format of a shell script, through the introduction of new syntactic elements such as 'workflow', 'sequence', and 'parallel' allowing for workflow semantics while retaining full integration into the interactive shell experience (interactive command discovery, online help, and so forth). The workflow engine used may be native within the system or provided by an existing workflow engine such as WINDOWS™ Workflow Foundation. The system also provides a built-in library of management tasks, a programmatic way to convert a script language command into a built-in workflow activity, workflow common parameters (a new set of parameters for existing shell script language commands become available as an existing language command is converted into a workflow activity), out of process activity hosting and execution (augmentation of the shell scripting language runtime to apply workflow concepts that enable users to run portions of a script in or out of process without the user having to do anything extra), an ability to log, trace, and correlate workflows and workflow activities with other language commands and other tasks in the management stack using standard notification and event repositories (including hooking tracing capabilities within components at a variable level across all of the manageability components), integration of stream processing into the workflow environment to enable activity-level progress reporting and the ability to plug in data collections in various locations, and coupling of workflow activities.

Command-Line Session Examples

Following are annotated example command line sessions using the workflow scripting system within WINDOWS™ POWERSHELL™. The first example illustrates the capability to define a workflow from the command line. The following text represents a script for creating a workflow within the scripting environment.

```
Workflow get-inventory
{
    $a = 2
    if ($a -eq 2)
    {
        "If block"
    }
    else
    {
        "else block"
    }
    # Brings in Workflow's parallel concept
    Parallel {
        Sequence
        {
            "Step1"
            "Step2"
        }
        "Parallel Step 2"
        Sequence
        {
            "Step1"
            "Step2"
        }
        # Call WINDOWS TM POWERSHELL TM scripts/scriptblocks
        Script {"Hello world from script"}
    } # end of parallel
    # Persists the workflow data to disk
    Persist
    # Call WINDOWS TM POWERSHELL TM cmdlets
    Get-Process -Name powershell
    # Workflows can suspend themselves to wait for admin input
    Suspend-Workflow
}
```

This example workflow has several interesting aspects. First, the introduction of the "parallel" keyword allows the definition of actions within a workflow that will be executed at the same time when the workflow is run by a workflow host. Each parallel block includes a sequence of commands. For ease of illustration, each block contains text that describes what that block might be used to do in a real workflow (e.g., "Step1" would be replaced with whatever step carries out the author's purpose for that workflow). As illustrated by this example, the system also provides the ability for the generated workflow to call scripts and cmdlets (WINDOWS™ POWERSHELL™ extension modules that provide additional commands). The translation between scripting and workflows works in both directions. Scripts can use workflow concepts, and workflows can use scripting concepts. The use of the "script" keyword demonstrates inline script within a workflow. The use of the "persist" keyword demonstrates a checkpoint of a workflow.

The next example illustrates the capabilities to use and interact with workflows from within a script. The session works with the following workflow definition, which can be provided at the command line using WINDOWS™ POWERSHELL™, much like the previous example.

```
Workflow Test-Workflow {
    Get-Process -Name powershell
    Start-sleep -Seconds 20
    Get-Service -Name winrm
}
```

This definition creates a workflow called "Test-Workflow" that has three actions: 1) displaying the status of any WINDOWS™ POWERSHELL™ processes, 2) sleeping for 20 seconds, and 3) displays information about the WinRM service (processes WSMan requests received over the network). Defining this workflow causes the system to automatically create an XML (XAML) definition that can be executed by the workflow runtime. The definition can be displayed as follows.

```
PS C:\Windows\system32> Get-Command Test-Workflow | Get-Member xa*
    TypeName: System.Management.Automation.WorkflowInfo
Name            MemberType    Definition
XamlDefinition  Property      System.String XamlDefinition {get;}
PS C:\Windows\system32> Get-Command Test-Workflow | fl xa*
XamlDefinition :
    <Activity>
        <Sequence>
            <ns0:GetProcess>
                <ns0:GetProcess.Name>
                    <InArgument x:TypeArguments="ns1:String[ ]">
                        <ns2:PowerShellvalue
                            x:TypeArguments="ns1:String[ ]"
                            Expression="'powershell'" />
                    </InArgument>
                </ns0:GetProcess.Name>
            </ns0:GetProcess>
            <ns3:Delay>
                <ns3:Delay.Duration>
                    <InArgument
                        x:TypeArguments="ns1:TimeSpan">
                        <ns2:PowerShellvalue
                            x:TypeArguments="ns1:TimeSpan"
                            Expression="'00:00:20'" />
                    </InArgument>
                </ns3:Delay.Duration>
            </ns3:Delay>
            <ns0:GetService>
                <ns0:GetService.Name>
                    <InArgument x:TypeArguments="ns1:String[ ]">
                        <ns2:PowerShellvalue
                            x:TypeArguments="ns1:String[ ]"
                            Expression="'winrm'" />
                    </InArgument>
                </ns0:GetService.Name>
            </ns0:GetService>
        </Sequence>
    </Activity>
```

Note that although this is a pretty simply workflow, creating it would normally entail opening a workflow editing application, understanding workflows enough to create and use the correct commands, and then building the workflow. Using the workflow scripting system, it was done above with a few simple lines on the command line. The following command runs the workflow as a new job.

```
PS C:\Windows\system32> $j = Test-Workflow -AsJob
PS C:\windows\system32> $j
Id  Name  State    HasMoreData  Location   Command
1   Job1  Running  True         localhost  Test-Workflow
```

As shown in the next lines, the job can be suspended and then later picked up and controlled (e.g., resumed) at another workstation, something previously impossible with just a scripting language. In addition, the job can be picked up after a system reboot and restarted or resumed.

```
PS C:\Windows\system32> Suspend-job $j
PS C:\Windows\system32> get-job
Id    Name    State       HasMoreData    Location      Command
1     Job1    Suspended   True           localhost     Test-Workflow
5     Job49   Suspended   True           localhost     Join-Domain
PS C:\Windows\system32> Receive-Job 1 -Keep
Handles  NPM(K)  PM(K)   WS(K)   VM(M)   CPU(s)  Id    ProcessName
634      38      80996   94072   643     9.58    3428  powershell
286      20      54768   58696   590     0.61    5860  powershell
PS C:\Windows\system32> $j
Id    Name    State       HasMoreData    Location      Command
1     job1    Suspended   True           localhost     Test-Workflow
PS C:\Windows\system32> get-job
Id    Name    State       HasMoreData    Location      Command
1     job1    Suspended   True           localhost     Test-Workflow
5     Job49   Suspended   True           localhost     Join-Domain
PS C:\Windows\system32> ipmo PSWorkflow
PS C:\Windows\system32> get-job
Id    Name    State       HasMoreData    Location      Command
3     Job49   Suspended   True           localhost     Join-Domain
4     Job1    Suspended   True           local host    Test-Workflow
PS C:\Windows\system32> Receive-Job -Name job1 -Keep
Handles  NPM(K)  PM(K)   WS(K)   VM(M)   CPU(s)  Id    ProcessName
634      38      80996   94072   643     9.58    3428  powershell
286      20      54768   58696   590     0.61    5860  powershell
PS C:\Windows\system32> Receive-Job -Name job1
Handles  NPM(K)  PM(K)   WS(K)   VM(M)   CPU(s)  Id    ProcessName
634      38      80996   94072   643     9.58    3428  powershell
286      20      54768   58696   590     0.61    5860  powershell
Status : Running
Name : winrm
DisplayName : Windows Remote Management (WS-Management)
PS C:\Windows\system32> get-job
Id    Name    State       HasMoreData    Location      Command
3     Job49   Suspended   True           localhost     Join-Domain
4     Job1    Completed   False          localhost     Test-Workflow
PS C:\Windows\system32> get-job | remove-job -force
PS C:\Windows\system32> get-job
```

The final example shows the automatic creation of common parameters that are used in a scripting environment for a workflow that does not explicitly define these parameters.

PS C:\Windows\system32> import-Module Get-Inventory.xam]

PS C:\Windows\system32> Get-Inventory -PSComputerName Machine1, Machine2 Machine3-PSCredential foo@contoso.com-AsJob-JobName MyJob This example shows parameters like PSComputerName and PSCredentials that are common in WINDOWS™ POWERSHELL™, that have been automatically created by the system for a XML-defined workflow. The example also illustrates the use of the "Import-Module" command to import the workflow from a XAML definition directly into WINDOWS™ POWERSHELL™ for subsequent execution.

System Components

Figure 1:
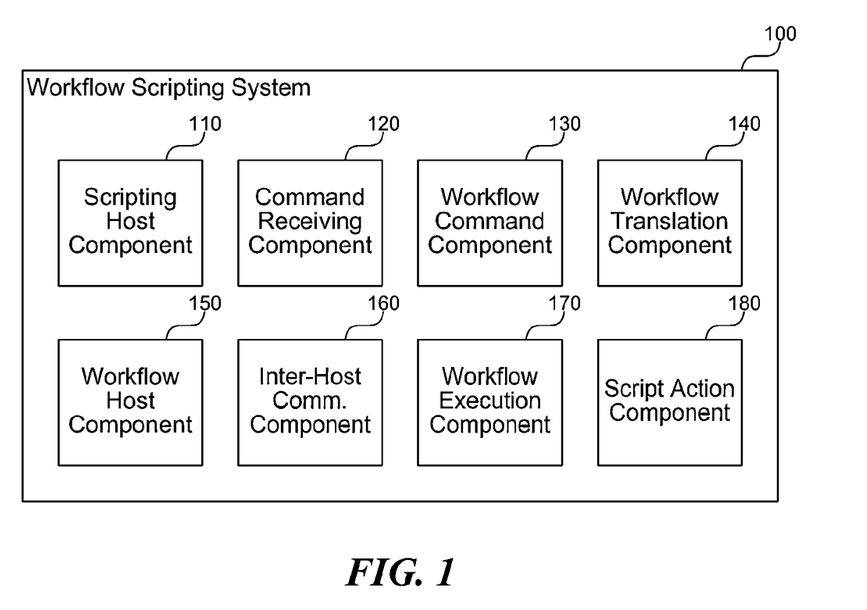
FIG. 1 is a block diagram that illustrates components of the workflow scripting system, in one embodiment.

FIG. 1 is a block diagram that illustrates components of the workflow scripting system, in one embodiment. The system 100 includes a scripting host component 110, a command receiving component 120, a workflow command component 130, a workflow translation component 140, a workflow host component 150, an inter-host communication component 160, a workflow execution component 170, and a script action component 180. Each of these components is described in further detail herein.

The scripting host component 110 includes a scripting environment capable of receiving script commands to perform tasks. The scripting host component 110 may include an existing scripting environment, such as WINDOWS™ POWERSHELL™, modified to implement the system 100 described herein. The scripting environment may provide a command prompt, interpret commands written in one or more scripting languages (e.g., JavaScript, VBScript, Perl, and so forth), and carry out the tasks specified by the commands. The scripting host component 110 may include an executable file that the user runs to invoke a process that provides an interface to the scripting environment (e.g., powershell.exe, cscript.exe, and so forth). The scripting environment may include an interface for receiving a text file or other list of commands, an interface for dynamically entering commands (e.g., a command prompt), an interface for programmatically receiving commands from other sources (e.g., a database or remote console), and so on. To carry out the received commands, the scripting host component 110 may invoke one or more external components or application-programming interfaces (APIs) that provide various functionality exposed by a computer system.

The command receiving component 120 receives and interprets commands provided to a user interface of the scripting host component 110. The command receiving component 120 may be designed to recognize one or more keywords that perform well-known core tasks of the scripting environment, such as loading script files, importing modules that define additional commands (e.g., cmdlets), displaying status information, and so forth. The command receiving component 120 also recognizes one or more workflow-related commands added to the scripting environment by an implementation of the system 100 described herein. The workflow commands may include keywords, parameters, and other definitions for defining workflows, defining workflow actions, defining how workflow actions execute (e.g., in parallel or serially), monitoring the status of workflows, retrieving workflow errors or other information, and so forth. Upon detecting a workflow-related command, the command receiving component 120 passes the command to the workflow command component 130 for processing.

The workflow command component 130 receives and processes script commands related to workflows. These commands may fall into a variety of categories, each of which the component 130 may handle differently. For example, commands designed to create workflows may cause the component 130 to store a workflow definition that persists information about any workflow created using the commands. In some embodiments, the component 130 may invoke the workflow translation component 140 to convert between scripting keywords used to define a workflow and a standard workflow format used by a workflow framework. For example, XAML is used to define workflows by WINDOWS™ Workflow Foundation, and workflow translation component 140 may output XAML based on any workflow script commands that define a workflow. Other workflow commands, such as those that inquire about the status of a workflow, may cause the workflow command component 130 to invoke the workflow host component 150 to determine more information about the workflow. For example, workflow frameworks, such as WINDOWS™ Workflow Foundation, provide APIs for accessing a workflow host and for inquiring about the status of workflows. Thus, the workflow command component 130 may transcode or adapt the semantics of script-based workflow-related commands to invoke appropriate APIs of the workflow framework to carry out the script's purpose.

The workflow translation component 140 translates workflow-related script commands that define a workflow into a standard workflow definition format recognized by the workflow host component 150. Workflows are traditionally created by using a workflow editing user interface, such as MICROSOFT™ Visual Studio or other development environment, and are then stored in a standard workflow format, such as XAML used by WINDOWS™ Workflow Foundation. The workflow translation component 140 can directly convert script commands into one or more interactions with stored objects, such as XAML elements, to define a workflow directly from a script or command prompt. The workflows created in this manner are much more accessible to IT personnel even without development or related experience, and can be created quickly with out-of-the-box components and without installing a dedicated workflow-authoring environment. For example, MICROSOFT™ WINDOWS™ 7 and later versions include WINDOWS™ POWERSHELL™ out-of-the-box, which can be modified to implement the system 100 described herein. Other operating systems provide other scripting environments that can be used in a similar manner.

The workflow host component 150 hosts workflows to provide a programming model and engine to implement business processes as workflows. WINDOWS™ Workflow Foundation is one example of a framework that provides a workflow host. The workflow scripting system 100 may leverage such existing hosts or provide its own host for hosting workflows. The workflow host component 150 may provide in-process execution of workflows, out-of-process execution of workflows, remote hosting of workflows, or any selection of the above chosen by a user of the system 100. Out-of-process execution can be useful to increase robustness and avoid errors bringing down the scripting host process. Remote execution can be useful to perform workflow actions that affect remote computer systems. The workflow host component 150 carries out the actions of a particular workflow passed to it, and provides a robust set of services and APIs for invoking workflows, defining how workflows are executed, checking workflow status, managing in-progress workflow jobs, receiving error and logging information about previously attempted or completed workflow actions, and so forth.

The inter-host communication component 160 communicates between the scripting host component 110 and the workflow host component 150. At various times the workflow host component 150 may be running workflow actions in the same process as the scripting host, out of process on the same machine as the scripting host, on remote machines, and any combination thereof. The inter-host communication component 160 provides a link between the scripting host and the workflow host, so that scripts can obtain status information, start and stop workflow jobs, and perform other actions related to work flows. The inter-host-communication component 160 may include a transport service and transport service client that use any of a variety of communication protocols, such as the WS-Management protocol or others. The component 160 may leverage various well-known communication standards for inter-process communication, network communication, and so on.

The workflow execution component 170 executes workflow actions from within the scripting environment. The scripting environment can import previously created workflows stored as XAML files or in another persistent data format, and can carry out the actions specified in the workflows by executing the workflow. The component 170 may invoke a separately provided workflow host or may execute the workflow directly. The component 170 may determine how a workflow will be run based on which computer systems the workflow is designed to affect (e.g., if it operates on remote computer systems or the local computer system), how long running the workflow will be, what type of robustness is needed, and so forth.

The script action component 180 provides a wrapper for invoking script commands from within a workflow action. Workflows are composed of functional blocks called activities, and are normally limited to whatever blocks are provided by the workflow design environment. In the case of the system 100 described herein, such environments are extended to provide access to the extensive set of available script commands, including those added over time by third parties through extensibility frameworks like WINDOWS™ POWERSHELL™ cmdlets. This allows the kind of bidirectional benefit described herein, in which scripting environments can leverage workflows, and workflows can leverage the scripting environment.

The computing device on which the workflow scripting system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Functional Operation

Figure 2:
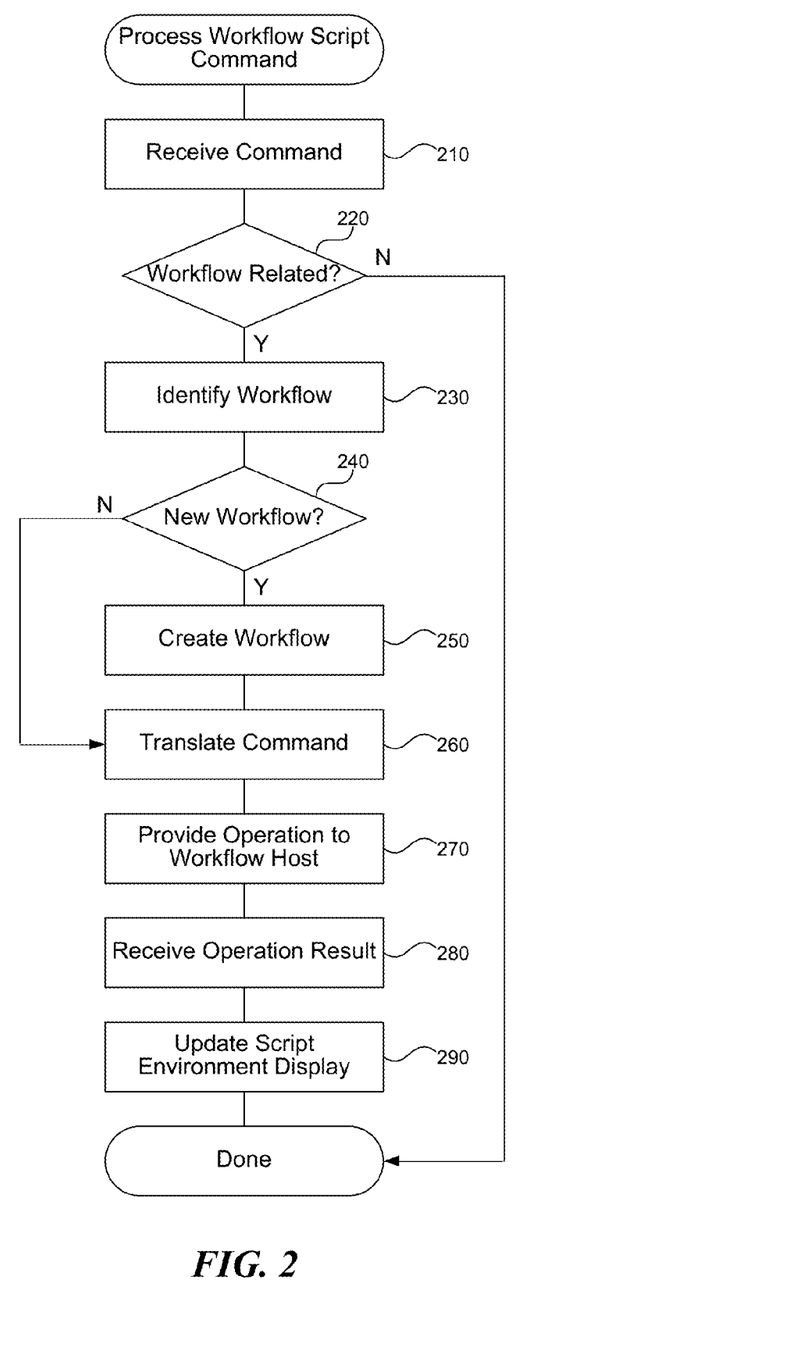
FIG. 2 is a flow diagram that illustrates processing of the workflow scripting system to process workflow-related commands received in a scripting environment, in one embodiment.

FIG. 2 is a flow diagram that illustrates processing of the workflow scripting system to process workflow-related commands received in a scripting environment, in one embodiment. Beginning in block 210, the system receives a command within a scripting environment. The command may be received via a command prompt displayed in a command console, via a previously loaded text file containing script commands, or through any other source of providing script commands. The command may include a keyword that identifies the command, one or more parameters associated with the command, or any other supplemental information related to the command.

Continuing in block 220, the system determines if the received command is workflow related, and if so continues at block 230, else the system completes and handles the command in a traditional manner. The system may recognize a predefined list of workflow commands and may provide an extensibility model that allows new workflow commands to be added and recognized by extending the scripting environment. A workflow-related command may create a new workflow, define workflow actions, request workflow status, execute or resume a workflow, and so forth.

Continuing in block 230, the system identifies a workflow associated with the received command. The command may identify a workflow by name or other identifier. The command may create a new workflow or request to execute or receive status information about a previously created workflow. Previously created workflows may have been created through the scripting environment as described further herein, or may have been created in a more traditional manner using a workflow design/editing environment. In some cases, identifying a workflow may be implicit rather than explicit. For example, an alternate implementation could just assume that everything is a workflow in a workflow mode.

Continuing in block 240, if the received command defines a new workflow, then the system continues at block 250, else the system jumps to block 260. The command may be associated with a series of commands that create a workflow. For example, a "workflow" command keyword may mark the beginning of a workflow creation block in a script, and other commands within curly braces or other delimiters may specify the actions and other information about the workflow that the script will create.

Continuing in block 250, the system creates the new workflow described by the received command or commands. The system may create the workflow in memory as well as persisting the workflow to a well-known workflow storage format, such as a XAML file. The persisted format may be in a format that can be read and edited using a workflow design tool, and that is recognized by workflow hosting software that can carry out the actions of the workflow. The system allows the user to use the scripting environment to perform very powerful tasks, but the user is not limited to the scripting environment and can freely migrate between using script commands and working with workflows using other tools (e.g., to define advanced actions that might benefit from the workflow designer environment).

Continuing in block 260, the system translates the received workflow-related scripting command into one or more workflow operations recognized by a workflow host. The translation may include accessing and invoking an object model associated with workflows, calling an API of the workflow host, loading or persisting stored workflows, and so forth. The translation may translate parameters received in one format at a scripting command prompt into object invocation parameters passed to an API. The system performs the translation appropriate for the workflow engine being used by the scripting environment.

Continuing in block 270, the system provides the translated workflow operation to the workflow host to carry out the received workflow-related command. For example, if the command requests the status of a workflow in progress, then the system may translate the status request into an API call to the workflow host, invoke the API, receive the API result, and translate the result into a command line status display in the scripting environment.

Continuing in block 280, the system receives an operation result from the workflow host in response to the provided operation. The result may include text information, programmatic objects (e.g., a date, error object, or other object), references to in-memory workflow objects, and so forth. The system translates the result into a format that can be used within the scripting environment. For example, the system may provide a numeric identifier for referencing the same workflow in subsequent scripting commands, display text to a command console, retrieve additional error information and display descriptive text, and so on. In some cases, the result may simply indicate that the operation completed successfully, and the system may display an "OK" or other indication.

Continuing in block 290, the system displays status information in the scripting environment in response to the received operation result. After block 290, these steps conclude.

Figure 3:
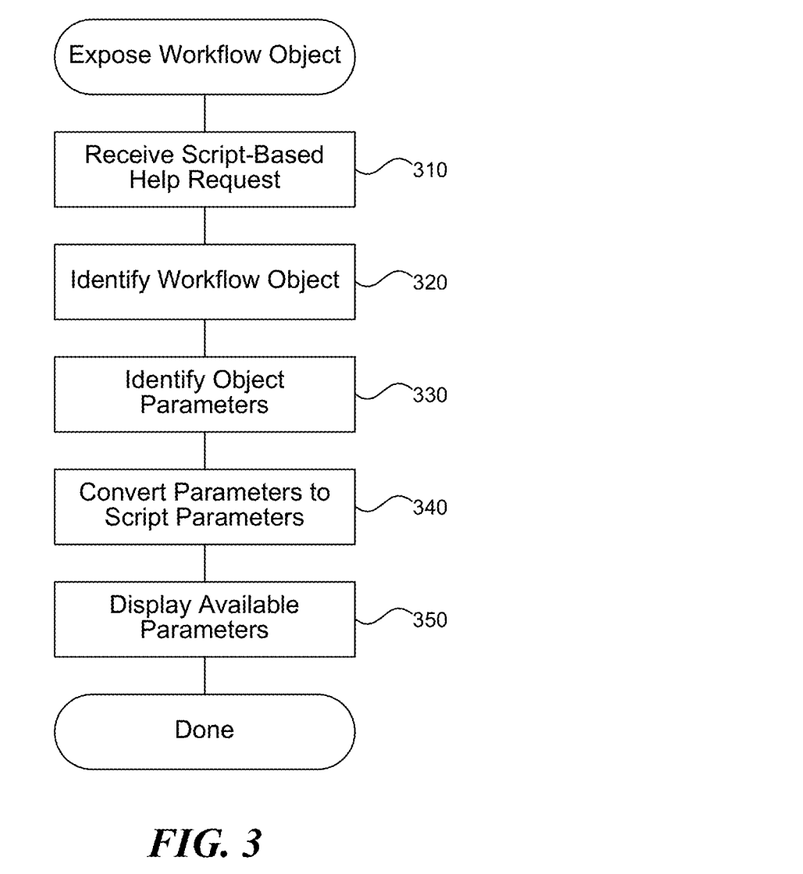
FIG. 3 is a flow diagram that illustrates processing of the workflow scripting system to expose a workflow object in a scripting environment, in one embodiment.

FIG. 3 is a flow diagram that illustrates processing of the workflow scripting system to expose a workflow object in a scripting environment, in one embodiment. Beginning in block 310, the system receives a script authoring request that identifies a workflow command to include in a script. Many scripting environments provide a command prompt with features such as auto-completion for which the environment offers a list of possible parameters or other information related to a script command at the command prompt. In the case of workflows, the system generates the information to display in response to such a request by loading the workflow, importing its supplemental information (e.g., actions, parameters, and so forth), translating that information into a form that can be used from a script, and displaying the translated information to a user.

Continuing in block 320, the system identifies one or more workflow objects responsive to the authoring request. For example, the user may have begun typing the name of a previously created or imported workflow, or may be typing a keyword associated with a predefined workflow-related command. The system identifies the object that the command may be referring to for which to provide helpful information. For example, the object may include an action that is a subset of a workflow, a workflow job identifier, or any other workflow-related object.

Continuing in block 330, the system identifies one or more parameters associated with the identified workflow object.

The parameters may include a computer name on which the object can be executed, credential information of a user account under which to execute the object, filenames, or any other parameter information that applies to the particular identified workflow object.

Continuing in block 340, the system converts the identified workflow object parameters into a format that allows the parameters to be provided in a script. This may include creating one or more parameter tags or keywords (e.g., "-name" for a "name" parameter), creating a list of available parameters, converting parameters of specific types into text equivalents (e.g., allowing a date object to be specified as a text date such as "1/1/2011"), and so forth.

Continuing in block 350, the system displays information about the converted workflow object parameters to a user in the scripting environment. The system may display help information at a command prompt, popup command completion information in a hovering window or list, or provide information about the workflow object in any other manner that helps the script author use workflow objects from within a script. After block 350, these steps conclude.

Figure 4:
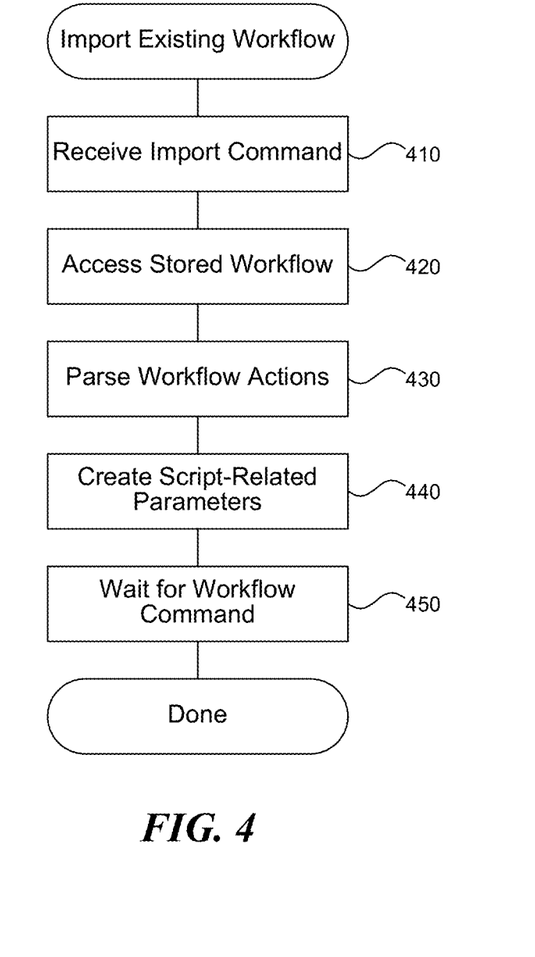
FIG. 4 is a flow diagram that illustrates processing of the workflow scripting system to import an existing workflow into a scripting environment, in one embodiment.

FIG. 4 is a flow diagram that illustrates processing of the workflow scripting system to import an existing workflow into a scripting environment, in one embodiment. The ability to import existing workflows allows the scripting environment to be used with workflows regardless of how or when they were created. A workflow need not have been created within the scripting environment to be used within the scripting environment.

Beginning in block 410, the system receives a request to import an existing workflow for use in a scripting environment. The request may include information for accessing the existing workflow, such as a file path to a file storing the workflow, a database reference to a database storing the workflow, or any other identifier for locating and accessing the previously defined workflow. The request may include a pre-defined script command added to the scripting environment for supporting the use of workflows from the scripting environment.

Continuing in block 420, the system accesses the existing workflow and loads information for using the workflow in the scripting environment. For example, the system may access a XAML file storing the workflow, enumerate the XML elements of the XAML file to read the workflow specification, and prepare in-memory objects for performing further operations on the workflow.

Continuing in block 430, the system parses one or more workflow actions that specify the task performed by the existing workflow. Using the previous example, the system may load the workflow from an XML file and read XML elements that specify the actions of the workflow, any steps associated with each action, parameters of each action, and so forth.

Continuing in block 440, the system creates one or more script-related parameters for working with the workflow actions and specifying input information related to the workflow. For example, a workflow for setting up a computer system may receive input that specifies which computer system to setup, which applications to install, and so forth. The script parameters allow a script author to specify the workflow input information directly within the scripting environment upon invoking the workflow or scheduling the workflow for later execution.

Continuing in block 450, the system waits for additional commands related to the workflow. For example, the script author may work with the workflow from a scripting command prompt to provide parameters, invoke the workflow, check status of the workflow, restart or pause the workflow, receive error and/or progress information, and so forth. After block 450, these steps conclude.

Figure 5:
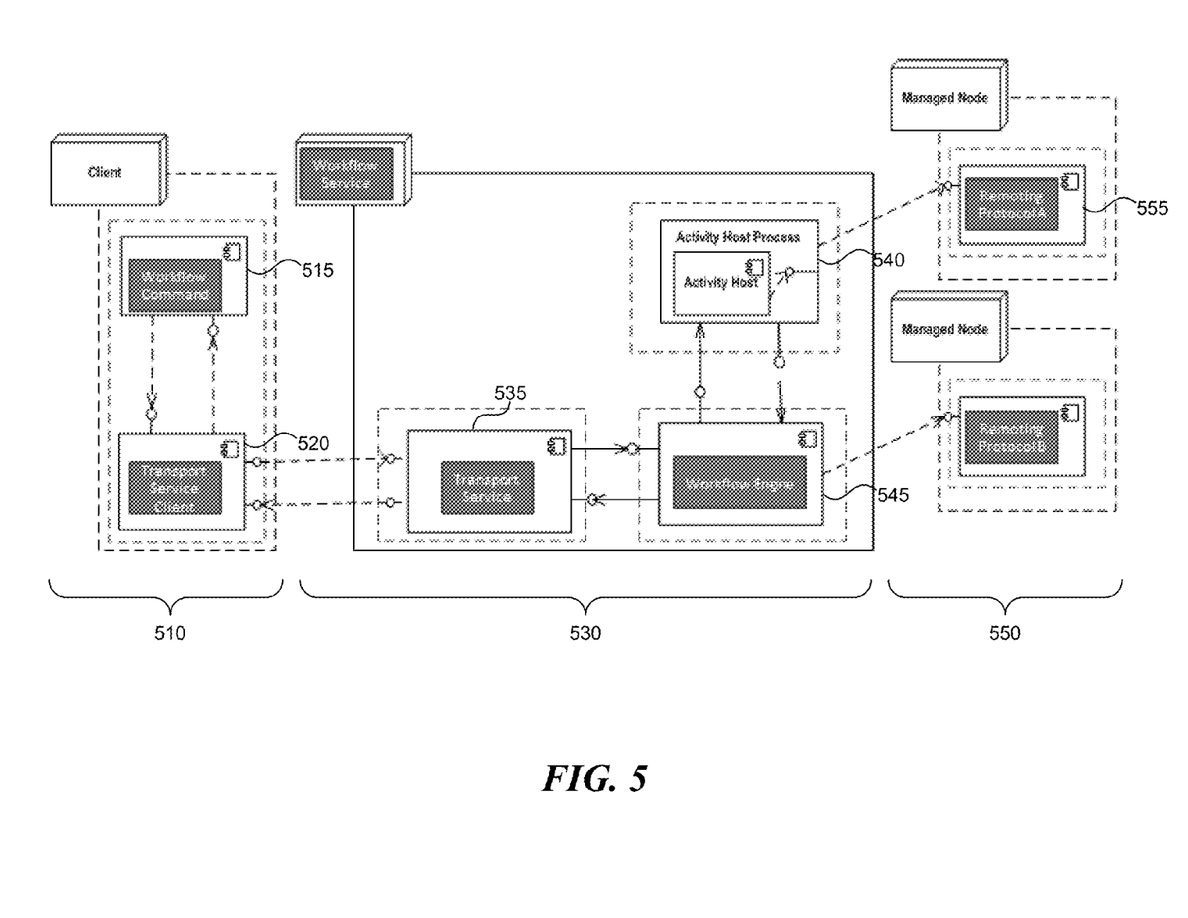
FIG. 5 is a block diagram that illustrates an operating environment of the workflow scripting system, in one embodiment.

FIG. 5 is a block diagram that illustrates an operating environment of the workflow scripting system, in one embodiment. The environment includes three separate computer systems on which components of the system are operating. The first computer system is a client 510 from which a user accesses a scripting environment. The scripting environment includes a workflow command component 515 and a transport service client 520. The workflow command component 515 receives and processes workflow related commands within the scripting environment as described further herein. The transport service client 520 communicates with the other computer systems to carry out the workflow commands. The second computer system provides a workflow service 530. The workflow service 530 includes a transport service 535, an activity host process 540, and a workflow engine 545. The transport service 535 receives commands sent from the client 410 and provides the to the workflow engine 545. The workflow engine 545 manages execution of the workflow, whether locally or on remote computer systems. The activity host process 540 hosts one or more workflow activities to carry out their steps on the local machine. The third or additional computer systems include one or more managed nodes 550 that execute workflow activities or are the subject of workflow activities. For example, if a workflow activity includes formatting the hard drive of a remote computer system, then the managed node 550 may the node on which the hard drive to be formatted exists. The managed nodes may also be used to separate intense processing onto separate computing resources. The managed 550 node may include one or more remoting protocols 555 for communicating with the activity host process 540 and/or workflow engine 545.

Figure 6:
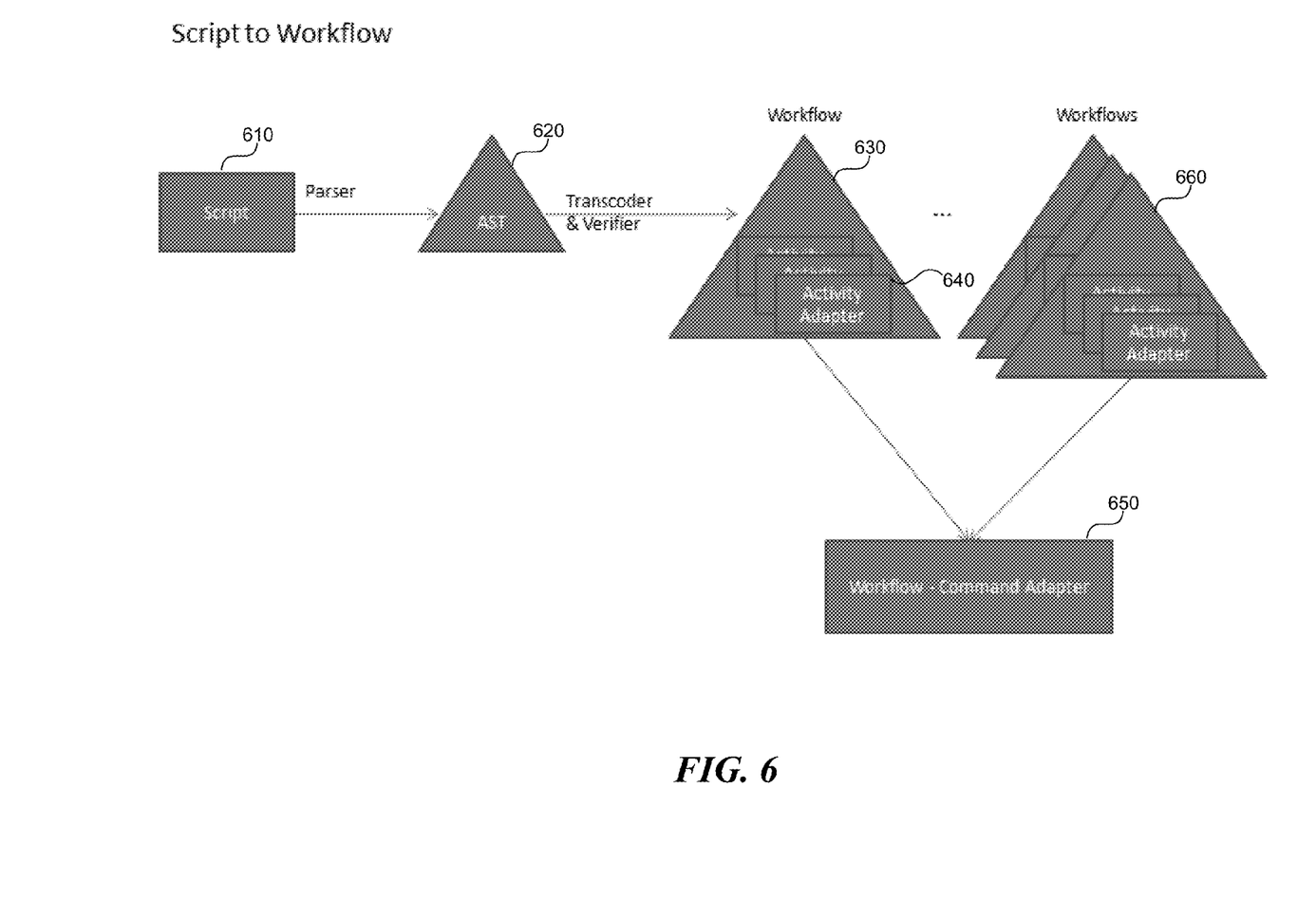
FIG. 6 is a data flow diagram that visually illustrates the process of creating a new workflow using scripting commands and using these and other workflows in a scripting environment, in one embodiment.

FIG. 6 is a data flow diagram that visually illustrates the process of creating a new workflow using scripting commands and using these and other workflows in a scripting environment, in one embodiment. A script 610 includes one or more commands for creating a workflow. Parsing converts the script 610 into an abstract syntax tree (AST) 620 that can be transcoded into workflow concepts and verified using a workflow engine or other verification. Transcoding creates a workflow 630 that includes one or more activities. The system may also create one or more activity adapters 640 that allow the activities of the workflow to be interacted with inside the scripting environment. An activity adapter 640 may wrap parameters of the activity, output, or other information associated with the activity to transcode the information into a form that is suitable for scripting. A workflow command adapter 650 recognizes and responds to commands related to the newly created workflow 630. The workflow command adapter 650 can also interact with workflows 660 created in other manners, such as through a workflow editor or designer.

In some embodiments, the workflow scripting system provides automatic fan-out, to execute workflows on multiple computer systems without intervention from the script author. The system automatically provides parameters, such as the WINDOWS™ POWERSHELL™ PSComputerName parameter for specifying where a workflow or workflow activity will run. In addition, the system may provide for automated selection of where to run various workflows based on available resources, scheduling of resources, access to relevant other resources (e.g., databases, networks, and so forth), and the like. The system can also provide an automatically generated list of the available computers on which to execute a workflow to free the script author from having to separately enumerate computers and select one.

In some embodiments, the workflow scripting system outputs a persistent version (e.g., using XAML) of each created workflow. This allows workflows to be edited or used with other workflow-based tools outside of the scripting environment. The system can create the persisted format without the script author having any knowledge of XAML, Workflow Foundation, or other workflow frameworks.

In some embodiments, the workflow scripting system allows a script user to manage workflows from multiple scripting environments, and to move from one scripting environment to another and managed the same workflow. For example, an administrator using WINDOWS™ POWERSHELL™ or a similar scripting environment could start a workflow from one computer system, and later check the status of the workflow from a WINDOWS™ POWERSHELL™ instance on another computer system.

In some embodiments, the workflow scripting system provides extensible persistent storage for workflows using WINDOWS™ Workflow Foundation. For example, although the system may store workflows in a file system by default, a particular installation may replace the file store with a SQL database for storing workflows. This allows workflows to be shared throughout a company or other organization and accessed from any computer system within the organization.

In some embodiments, the workflow scripting system captures errors during a workflow's execution to a scripting environment error stream. Normally, error information from workflows is not available in scripts until the script is complete (e.g., a "Job Failed" error after completion), so a running workflow would not provide any information until complete. However, with the workflow scripting system, workflow progress is updated into the WINDOWS™ POWERSHELL™ error stream or other scripting environment status stream. This allows checking the status of workflows while they are still running and providing workflow status in real-time. The workflows can then be paused and later resumed as needed based on an organization's requirements. Workflow output is an important stream that workflows rarely provide as it is generated, but that are easily available within the workflow scripting system.

In some embodiments, the workflow scripting system allows workflows to be run as a particular user. Because state is persisted in workflows, even across reboots, this means that a workflow can run as a particular user even across reboots of the computer system, which is difficult today.

In some embodiments, the workflow scripting system includes a "suspend-workflow" operation that allows a workflow to request administrative intervention. If the workflow detects that it cannot proceed without the intervention from the administrator then the workflow can request the suspension of the workflow. This will give the administrator an opportunity to fix the issue and resume the workflow.

From the foregoing, it will be appreciated that specific embodiments of the workflow scripting system have been described herein for purposes of illustration, but that various modifications may be made without deviating from the spirit and scope of the invention. Accordingly, the invention is not limited except as by the appended claims.

We claim:

1. A computer-implemented method to process workflow-related commands received in a scripting environment, the method comprising:
   receiving a command within a scripting environment;
   determining if the received command is a command for a core task of the scripting environment or if the received command is a workflow related command by recognizing one or more workflow-related commands, wherein the workflow-related commands include one or more keywords, parameters, or other metadata for at least one of defining workflows, defining workflow actions, defining how workflow actions execute, monitoring the status of workflows, retrieving workflow errors, or retrieving workflow data;
   when the received command is not workflow related processing the received command in a traditional manner for the scripting environment;
   when the received command is determined to be work-flow related, then:
   identifying a workflow associated with the received command;
   translating the received workflow-related scripting command into one or more workflow operations recognized by a workflow host;
   providing the translated workflow operation to the workflow host to carry out the received workflow-related command; and
   receiving an operation result from the workflow host in response to the provided operation, wherein the preceding steps are performed by at least one processor.

2. The method of claim 1 wherein determininq that the received command is a workflow related command comprises determining that the command includes a keyword that is a member of a predefined list of workflow commands or provides other information identifying that the command is a workflow-related command.

3. The method of claim 1 wherein determining that the received command is a workflow related command comprises determining that the command identifies a previously created workflow.

4. The method of claim 1 wherein identifying the workflow comprises matching command data to an identifier associated with a workflow recognized by the scripting environment.

5. The method of claim 1 further comprising determining that the received command requests creation of a new workflow, and creating the new workflow described by the received command.

6. The method of claim 5 wherein creating the new workflow includes persisting the workflow to a workflow storage format readable by one or more workflow tools.

7. The method of claim 1 wherein translating the received command comprises accessing and invoking an API associated with workflows.

8. The method of claim 1 wherein translating the received command comprises translating one or more parameters received in one format at a scripting command prompt into object invocation parameters passable to an API of a workflow host.

9. The method of claim 1 wherein providing the operation to the workflow host comprises translating the status request into an API call to the workflow host and invoking the API.

10. The method of claim 1 wherein receiving the operation result comprises translating information received from the workflow host into text information displayable by the scripting environment.

11. The method of claim 1 wherein receiving the operation result comprises receiving error information during execution of the identified workflow.

12. A computer system for automatic transcoding and semantic adaptation between scripting and workflow systems, the system comprising:
   a processor and memory configured to execute software instructions embodied within the following components;

a scripting host component that includes a scripting environment capable of receiving script commands to perform tasks;

a command receiving component that receives and interprets commands provided to a user interface of the scripting host component, the command receiving component further configured to determine if the received commands are workflow related commands or if the received command is a command for a core task of the scripting environment and is further configured to recognize one or more workflow-related commands, wherein the workflow-related commands include one or more keywords, parameters, or other metadata for at least one of defining workflows, defining workflow actions, defining how workflow actions execute, monitoring the status of workflows, retrieving workflow errors, or retrieving workflow data;

a workflow command component that receives and processes script commands related to workflows identified by the command receiving component;

a workflow translation component that translates workflow-related script commands that define a workflow into a standard workflow definition format recognized by a workflow host;

a workflow host component that hosts workflows to provide a programming model and engine to implement business processes as workflows;

an inter-host communication component that communicates between the scripting host component and the workflow host component to carry out translated commands; and a workflow execution component that executes workflow actions from within the scripting environment.

13. The system of claim 12 wherein the workflow command component receives one or more commands for creating workflows, and in response stores a workflow definition that persists information in memory or using other storage describing a created workflow.

14. The system of claim 12 wherein the workflow translation component converts information received in the scripting environment to one or more interactions with stored objects that represent workflows.

15. The system of claim 12 wherein the workflow translation component converts information received in the scripting environment to one or more API calls for interacting with the workflow host.

16. The system of claim 12 wherein the inter-host communication component provides a transport service for sending commands received at a client computer system to a workflow host running on a different computer system.

17. The system of claim 12 wherein the workflow execution component invokes the workflow host component to host the workflow and execute the workflow's actions.

18. The system of claim 12 further comprising a script action component that provides a wrapper for invoking script commands from within a workflow action.

* * * * *